United States Patent [19]

Hong et al.

[11] Patent Number: 5,085,942
[45] Date of Patent: Feb. 4, 1992

[54] SEALANT PRODUCT, LAMINATE THEREOF, AND PNEUMATIC TIRE CONSTRUCTED THEREWITH

[75] Inventors: Sung W. Hong, Cheshire; Philip J. Cangelosi, Waterbury, both of Conn.

[73] Assignee: The Uniroyal Goodrich Tire Company, Akron, Ohio

[21] Appl. No.: 497,051

[22] Filed: Mar. 21, 1990

Related U.S. Application Data

[60] Division of Ser. No. 80,842, Aug. 3, 1987, Pat. No. 4,913,209, Continuation-in-part of Ser. No. 44,628, May 1, 1987, which is a division of Ser. No. 693,090, Jan. 21, 1985, Pat. No. 4,664,168.

[51] Int. Cl.$^5$ ............................................. B32B 25/04
[52] U.S. Cl. ..................................... 428/492; 428/519; 428/912; 152/502; 152/504
[58] Field of Search .................. 428/519, 492, 912; 152/347

[56] References Cited

U.S. PATENT DOCUMENTS

| | | | |
|---|---|---|---|
| 3,981,342 | 9/1976 | Farber et al. | 152/347 |
| 4,064,922 | 12/1977 | Farber et al. | 152/347 |
| 4,115,172 | 9/1978 | Baboff et al. | 156/115 |
| 4,183,390 | 1/1980 | Hallman | 428/912 |
| 4,239,076 | 12/1980 | Chautard et al. | 428/912 |
| 4,256,158 | 3/1981 | Chautard et al. | 428/912 |
| 4,664,168 | 5/1987 | Hong et al. | 152/504 |

Primary Examiner—Edith R. Buffalow
Attorney, Agent, or Firm—Alfred D. Lobo; Alan A. Csontos

[57] ABSTRACT

A carcass for a self-sealing pneumatic tire is constructed by starting with an extruded thin flat strip of puncture sealant both surfaces of which are detackified. The strip is place on a building drum and its upper surface is wiped clean so that an inner liner may be adhered to it. Thereafter, the carcass is conventionally completed with superimposed successive layers of belts, and tread along with bead rings, etc. The carcass is then cured in a conventional curing press so that the sealant is cured by contact with the curing bladder. The curing sealant is not restrained in any way, but does not flow. Alternatively, a laminate of the sealant is formed with the inner liner, with only the exposed surface of the sealant detackified so that it adheres neither to the building drum nor to the curing bladder. The detackifier remains on the sealant. The recipe for this effective sealant product requires a ratio of high molecular weight elastomer to low molecular weight elastomer greater than 1; also, that there be at least as much, by weight, processing aid as there is high mol wt elastomer. Such a recipe has a room temperature peak Mooney viscosity above 70°, and, after curing, a peak Mooney viscosity at 150° F. in the range above 15° but below 30°. A combination of homogenizer and tackifier facilitates maintaining the necessary viscosity of the uncured sealant recipe. The tire provides excellent self-sealing results.

20 Claims, 1 Drawing Sheet

SEALANT PRODUCT, LAMINATE THEREOF, AND PNEUMATIC TIRE CONSTRUCTED THEREWITH

CROSS-REFERENCE TO RELATED APPLICATION

This application is a continuation-in-part application of Ser. No. 044,628 filed May 1, 1987 which is in turn a divisional of Ser. No. 693,090 filed Jan. 21, 1985 now issued on May 12, 1987 as U.S. Pat. No. 4,664,168. This is a division of application Ser. No. 080,842, filed Aug. 3, 1987.

BACKGROUND OF THE INVENTION

This invention relates to an improvement in self-sealing tubeless pneumatic tires constructed upon a laminate of elastomers comprising an air-impervious liner or elastomeric strip ("inner liner") coated with a thin layer of bare (that is, not covered and not constrained by a sheet of flexible material), elastomeric puncture-sealing material ("sealant"). The laminate of elastomers, namely the inner liner coated with the sealant is referred to herein as the elastomer laminate ("laminate" for brevity) in which the upper surface of the sealant is detackified with a detackifier which prevents adhesion of the surface to metal, and also to a hot, pressurized curing bladder. The uncured (uncrosslinked) sealant is essentially free of crosslinks. The laminate can be used as the first structural component of a tire to be constructed on a building drum because the detackified upper surface of the sealant does not stick to the drum.

In those instances where sealant is desired without the inner liner, this invention relates to a relatively thin generally laminar extrudate, less than about 10 mm thick, and at least 10 times as wide as it is thick, of an extruded sealant product which has unique flow (viscosity) properties. However, as extruded, the sealant strip has excellent adhesive qualities which must be countered by coating its upper and lower surfaces with detackifier. Thus surface-detackified, a desired length of the sealant product strip may be cut and placed on a building drum to initiate the building of a tire carcass. After the sealant product strip is placed upon the drum, the detackifier is removed from the upper surface of the strip, and then, an inner liner is conventionally wrapped over the strip, followed thereafter by successive layers which form the carcass.

This invention derives from the desire to eliminate the flow-restraining means referred to as "edge strips" in our copending patent application Ser. No. 044,628,090 filed May 1, 1987, and U.S. Pat. No. 4,664,168. The edge strips were necessary because we did not know how to formulate the sealant so that it would not flow under heat and pressure in the curing press. We were unaware of the critical importance of maintaining the weight ratio of high molecular weight (mol wt) elastomer to low mol wt elastomer greater than 1, nor were we aware of the role of he "tackifier" (so termed in U.S. Pat. Nos. 3,981,342; 4,064,922; and 4,115,172), having regarded the tackifier simply as a 'processing aid' with little, if any, effect on viscosity.

Particularly, we used a mixture of tackifiers, including the same mixture of Struktol ® 30 and Piccopale ® resin as used in the '922 patent, to provide the particular balance of uncured and cured physical properties taught therein, recognizing that neither tackifier contributed to the cured Mooney viscosity of the sealant, but each greatly affected the properties of the sealant. Attempts to raise the viscosity of the uncured '922 sealant so that it would essentially not flow under curing conditions, yet to lower its cured viscosity so that it would seal punctures more effectively, prompted an investigation into numerous modifiers and processing aids. During this investigation, we found that, when we increased the ratio of high mol wt elastomer to low mol wt elastomer in the mixture, the viscosity increased, both before and after curing the mixture, which is what we expected. This increase in viscosity, obtained by increasing the relative amount of high mol wt elastomer, was too high to give satisfactory self-sealing of punctures. It was therefore particularly surprising that, as long as there was more high mol wt. than low mol wt. elastomer, by using more processing aid in the sealant recipe than used in the '922 patent, whether the processing aid was a tackifier or homogenizer, the viscosity of the uncured sealant was increased, and that of the cured sealant was decreased so as to give excellent self-sealing.

Further, though acceptable results are obtained with several different tackifiers, and with several combinations of different tackifiers, the excellent results obtained with a homogenizer in combination with a tackifier was overlooked. In particular, the homogenizer's peculiar role relative to the amount of tackifier, in influencing viscosity under heat and pressure was not appreciated.

A tackifier is a material which increases tack but has little effect on end properties after cure. A homogenizer is a material which improves the blending characteristics of elastomers of dissimilar polarity or viscosity, also with little effect on end properties after cure. Because tackifiers and homogenizers are low mol wt compounds it was to be expected that they would have no effect on the cured properties of the sealant mixture (recipe). Consistent with their combined presumed 'non-effect' on cured properties, the teaching of the '922 patent regarded its combination "tackifier" as being a diluent for the low mol wt elastomer, requiring that the sum of the weights of low mol wt elastomer and tackifier be greater than that of the high mol wt elastomer.

It is therefore particularly surprising that, as long as there is a major proportion of high mol wt elastomer present, relative to the low mol wt material, it is not critical which tackifier or homogenizer, or what combination of tackifiers, or of homogenizers, or which combination of homogenizer and tackifier is used, provided the peak Mooney viscosity of the recipe is maintained in the range specified. This peak Mooney viscosity at 75° F. (room temperature) ("MLP/rt") is in the range from above 70 to about 110, and is best maintained with a weight ratio of homogenizer to tackifier in a specified range. In this range, the pronounced effect on viscosity, both before and after curing the sealant mixture, is such that the edge strips of our '168 patent can be eliminated.

As was disclosed in the '922 patent to Farber et al., a mixture of high and low mol weight elastomers, the latter being present in an amount more than 50% by weight based on the combined weight of the high and low mol wt elastomers, and tackifier or plasticizer, and, cured to a limited extent, could adequately control flow under conditions of use of (running) the tire. The high mol wt elastomer furnished rigidity and strength, and the low mol wt furnished adhesion and conformability. By increasing the proportion of high mol wt elastomer, the tendency of flow attributable to the low mol wt elastomer is decreased but not completely removed. Therefore, the '922 mixture was partially cured, allowing the high mol wt elastomer to act as supporting structure to retard flow, without crosslinking the low mol wt elastomer to the point where its ability to function as sealant would be significantly impaired.

The function of the low mol wt elastomer as sealant was misdirected. We have found that, as is illustrated in an extreme case to establish the fact, there may be only one-tenth as much low mol wt elastomer as high, provided there is an appropriate choice of tackifier(s); in the best mode, there is more homogenizer than tackifier present.

Moreover, the flow properties of uncured sealant as now formulated, permits it to be cured in a green carcass with minimal flow onto the sidewalls of the carcass as it is vulcanized ("cures") in contact with a hot pressurized bladder in a curing press, only because the detackifying function of the detackifier is not vitiated by the heat and pressure. Because the uncured '922 sealant, as an integral part of a green carcass, could not be cured in a curing press, the less preferred embodiment of the '922 invention required that a flat strip of extruded sealant be first cured, then incorporated on top of the liner in an uncured steel belted radial tire which was cured in a conventional tire press. In example VII of the '922 patent, the strip was cured by irradiation with a 1.4 million volt electron beam at a dosage of 20 megarads. The cured strip was placed on top of the liner inside a green tire, and the tire could be cured in a conventional tire press because the bladder did not adhere to the cured sealant on the liner. But curing the sealant on the inner liner also cures the inner liner with predictable results in a tire using the cured laminate.

It became imperative that the laminate not be precured for several reasons. To begin with, precuring the laminate resulted in using a precured inner liner to build a tire. One skilled in the art will appreciate that when a tire is expanded in the second stage, a precured inner liner will not have the elasticity required of it. But no attempt was made to cure an uncured laminate partly because it was evident that the sealant flowed uncontrollably during cure, and partly because no detackifier was found which readily provided the several features demanded of it. A detackifier was required to prevent adhesion of the sealant surface to a metal building drum, and also to prevent adhesion of the curing sealant (at about 350° F.) to the hot pressurized curing bladder under typical operations in a conventional curing cycle. It is evident that if the sealant adhered to the drum, whether it adhered to the curing bladder was immaterial. In addition, the detackifier was to remain on the surface of the cured sealant, rather than being transferred to the curing bladder, because a non-detackified sealant surface is deemed more desirable to seal a puncture caused by a nail which, after piercing the tire's tread and sealant, is ejected from tire.

Hence, in the more preferred embodiment of the '922 invention, sealant (referred to as "post-cure sealant" because sealant was deposited in a cured tire) was extruded onto the inner liner of a cured tire, as described in detail in U.S. Pat. No. 4,115,172 to Baboff et al., so that the sealant adheres to the inner circumferential surface of the crown, on the opposite side of the road-contacting tread surface, and the sealant was cured by heating for several days at a temperature high enough to cure the sealant, typically about 150° F., because the curing agent (curative) used was a tetraalkyl titanate Later attempts to cure an uncured laminate were made after the discovery of a commercially available material was found to be an effective detackifier. Still, all attempts to cure the laminate in the curing press resulted in unacceptable, if not uncontrolled flow of the curing sealant in the tire being cured. We addressed the flow problem during cure in our '168 patent by the use of flow-restraining edge strips.

The equivocal results obtained, coupled with the adverse economics of such post-cure sealant deposition, particularly as taught in the '342 and '922 patents to Farber et al., was followed by depositing the sealant before molding and curing a green tire carcass, referred to as pre-cure sealant; but the sealant was crosslinked to increase its viscosity, then was covered with a layer of flexible material to prevent adhesion of the sealant to the drum, as disclosed in the '342 and '922 patents. Covering the sealant caused blistering during cure. It became necessary in the prior art patents, to adhere the sealant and flexible material to the tire in a separate operation, after the tire was molded and cured.

Eventually, the economics of the additional operations for a crosslinked sealant being deposited after curing, led to a partially uncovered sealant constrained by edge strips. The edge strips restrain flow of the sealant during contact with a curing bladder under curing conditions namely about 350° F. and about 350 psig. This latter concept, utilizing the '922 sealant composition, is disclosed in our '168 patent.

In the best mode, we have added the homogenizer to the ingredients of the '922 sealant because we found that a recipe in which the sum of the weights of homogenizer and tackifier is greater than that of any other single component of the recipe, increases the viscosity of the sealant so as to essentially negate its flow during curing of the tire, yet permits the cured sealant (after the tire is cured) to flow enough to seal a puncture during use of the tire mounted on an operating vehicle.

The sealant laminated to an inner liner, disclosed in the '922 patent, comprised a blend of a major proportion of a low mol wt liquid elastomer mixed with a tackifier or plasticizer, and a minor amount by weight of a high mol wt elastomer. The blend, when crosslinked, had a peak Mooney viscosity of from 30 to 55 ML at 150° F. (MLP/150). By trial and error, Farber et al had determined that a cross-linked sealant composition with a peak Mooney viscosity outside the range specified, would be unusable as a sealant. If the viscosity was lower than 30 MLP/150, the sealant would tend to flow down from the shoulder and sidewall areas of the tire when it is run at high speed as well as out of the hole when the tire is punctured. If the viscosity was higher, it would not flow sufficiently to seal a puncture.

Even at the high end of the range, the sealant was too fluid under conventional curing-press conditions. We coped with the problem, as disclosed in our '168 patent by providing sealant-retaining edge strips, carried by the inner surfaces of the sidewalls of the tire. These strips functioned as flow-restraining means because the viscosity of the '922 sealant was low enough to flow during curing of the tire, and required to be restrained.

Notwithstanding the effectiveness of the edge strips the difficulty of reliably and reproducibly manufacturing tires with such edge strips resulted in unfavorable economics of production. The decision was made to eliminate the edge strips in favor of renewing the search for a crosslinked sealant composition which does not flow within the green carcass when it is being cured in a curing press, and the bare surface of which crosslinked composition, upon curing, does not stick to the tire-building drum, yet after the tire is cured, the sealant is fluid enough to plug a puncture.

This invention embodies the culmination of that search.

The '342 patent, like the '922 patent, used a major amount of low mol wt elastomer relative to the high mol wt, but unlike the '922 patent, used no tackifier or plasticizer. The result obtained in the '342 patent was "to give an initial Mooney viscosity at room temperature (the initial peak reading attained which is usually within the first few seconds) of between 30 and 70 (large rotor, ML) in the final crosslinked mixture, with a preferred range of 40 to 60. Below 30 ML, the composition would tend to flow down from the shoulder and sidewall areas of the tire when it is run at high speed, as well as out of the hole when the tire was punctured. Above 70 ML, the sealant capability of the composition is sufficiently impaired to render it unusable for practical purposes". (see btm of col 3). The viscosities given were incorrectly given as being at room temperature when in fact they were measured at 150° F.—a correction made in the '922 patent discussed hereinbefore.

SUMMARY OF THE INVENTION

It has been discovered that a particular sealant product, substantially free of crosslinks, when laminated to an air-impermeable elastomeric strip used as an inner liner, may in turn be laminated to the first of plural superimposed belts to form a green tire carcass which may then be conventionally cured in a curing press, without the sealant being covered, and without requiring that the liner be equipped with any means to restrain the flow of sealant, while it is curing ("curing sealant"), when the tire is in the press.

It is therefore a general object of the present invention to provide an improved self-sealing pneumatic tire with a layer of bare sealant material laminated to an inner liner to form an elastomeric laminate free of sealant restraining means, and the liner may be integrated into the tire structure prior to molding and curing the tire.

It is also a general object of this invention to provide a surface-detackified, uncrosslinked sealant product consisting essentially of (i) a blend of a major amount by weight of high mol wt elastomer, and a minor amount by weight of low mol wt elastomer, based on the combined weight of the high and low mol wt elastomers; and, (ii) at least as much processing aid, whether homogenizer or tackifier, as there is high mol wt elastomer; and, (iii) a curative in an amount sufficient to provide said sealant with a peak room temperature (75° F.) Mooney viscosity (MLP/rt) in the range from above 70 to about 110, and, when cured, with a peak Mooney viscosity at 150° F. (MLP/150) below 30, preferably in the range from above about 15 but less than 30.

It is also a general object of this invention to provide a laminate formed by continuously extruding a generally flat strip of sealant onto a web to which the lower surface of the sealant adheres. The upper surface is coated (surface-detackified) with a film of detackifier. The web is preferably liner (butyl rubber) stock or carcass (natural rubber) stock, typically less than about 8 mm thick, used to provide an air-impermeable elastomeric liner within the carcass. The laminate is then cut to a predetermined length to encircle a tire-building drum. To handle the laminate conveniently, the web is placed on a co-continuous backing sheet of synthetic resinous material, preferably a polyolefin such as polyethylene having a thickness of from about 1-5 mils, and a width slightly greater than that of the inner liner (web). The laminate is substituted for a conventional inner liner in the usual construction of a green carcass which is then cured in a curing press. In the cured tire, the circumferential edges of cured sealant are smoothly blended into the sidewalls, but flow of sealant is so limited that the thickness of the sealant in the region of the circumferential centerline is no less than 80% of the thickness of the uncured sealant just before being placed in the curing press.

BRIEF DESCRIPTION OF THE DRAWINGS

The foregoing and other objects and features of the present invention will be more clearly understood from the following detailed description thereof when read in conjunction with the accompanying drawings in which.

DETAILED DESCRIPTION OF PREFERRED EMBODIMENTS

Figure 1:
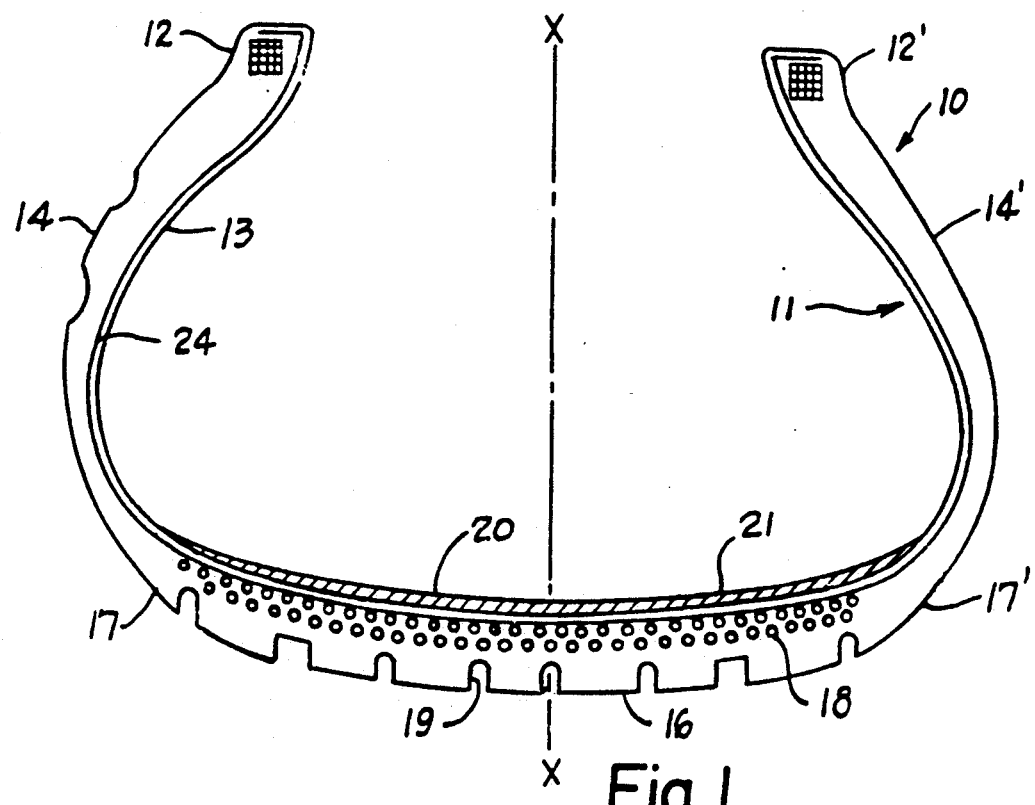
FIG. 1 is a cross-sectional elevation view of a self-sealing pneumatic tire diagrammatically illustrating a layer of sealant on a single elastomeric inner liner.

Referring now to FIG. 1, there is diagrammatically illustrated a cross-sectional view of a tubeless tire 10 constructed in accordance with the subject invention. The tire 10 includes a tire carcass 11 which might be composed of radial or substantially radial superimposed carcass plys of conventional form. The carcass 11 terminates at its innermost edges in a pair of beads 12 and 12'. The lateral regions of the carcass form sidewall regions 14 and 14' which generally form or define the maximum width of the tire 10. A tread region 16 forms a crown region of the carcass 11 and a pair of buttress regions 17 and 17' are positioned between and connect the tread 16 and sidewalls 14 and 14'. In the interior of the tread region 16, there is generally found one or more belts 18 that are provided to enhance the performance and durability of the tire 10. The surface region of the tread 16 forms a tread pattern 19. The inner surface 13 of the tire is generally covered by an air-impermeable inner liner 24 made of, for example, butyl rubber.

The cord ply components of the tire 10 are usually made of layers of rubberized cords or cables made of any suitable natural or synthetic fiber such as nylon, rayon, polyester, metal wire, glass fiber, etc., and each of the plys of the carcass 11 extends from bead 12 to bead 12'. The belts 18 can also be made of any of several materials, including glass fiber, aromatic polyamide, metal or rayon.

The description of the tire thus far is basically conventional and generally in accordance with the current state of the art.

The novel tire 10, illustrated in FIG. 1 is of the self-sealing variety. The mid-equatorial plane of the tire is indicated by a dashed line X—X. A flat strip or layer (to distinguish it from the elastomer strip used as inner liner) of sealant 20 is adhered to the inner surface of the inner liner 24, covering its inner surface where it is most likely to be punctured (puncture region), namely between sidewalls 14 and 14'. Typically, the layer is less than 0.5 in thick, and much wider than it is thick, being usually at least ten times wider than it is thick, and it covers from about 20% to substantially the entire area of the liner's upper surface. The elastomeric inner liner 24 and the elastomeric sealant 20 together form an elastomeric laminate 22 which is the first component of the tire as it is built on a building drum.

In the cured tire, boundaries 23 and 23' of the cured sealant are smoothly blended into the sidewalls due to the high pressure at the raised edges of the substantially uniformly flat sealant, preferably from about 0.1" to about 0.25" thick, the pressure being exerted by the hot bladder used in a curing press. Preferably from about 30% to about 50% of the inner surface of the tire may be covered with sealant, it being apparent that depositing the sealant where no puncture is likely, serves no useful function.

The upper surface of uncured sealant in the tire carcass is coated with a detackifier 21, present as a thin film in an amount sufficient to prevent adhesion of the surface to a building drum, and after the tire is built, to a hot curing bladder. The detackifier, which is non-degradable under curing conditions, is not a self-supporting film but preferably an organic polymer conveniently applied as a sprayable solution, and, for evident reasons, is an essential part of the sealant product. The composition of the detackifier is not narrowly critical provided it is non-reactive with the sealant and is used in an amount sufficient to fulfill its above-stated functions. Some release agents such as a silicone spray or zinc stearate are also effective detackifiers if applied to the sealant surface. Upon the tire being cured, the detackifier is maintained on the surface of the sealant.

Figure 2:
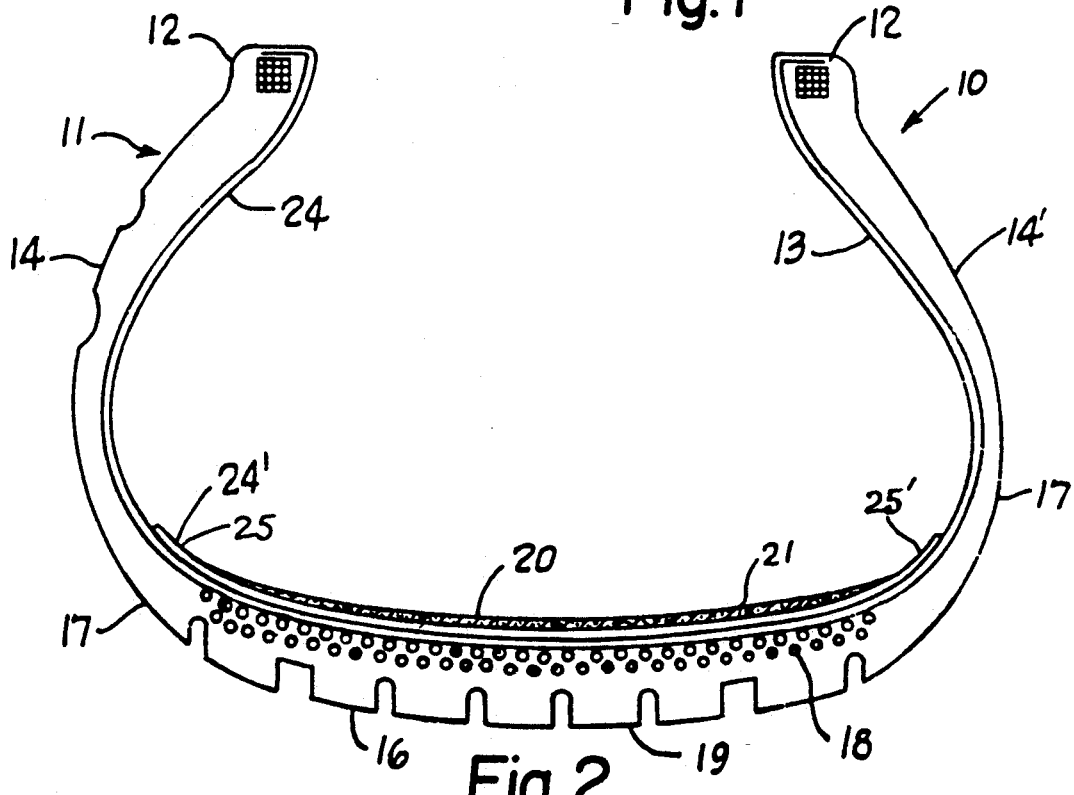
FIG. 2 is a cross-sectional elevation view of another embodiment of a self-sealing pneumatic tire diagrammatically illustrating a layer of sealant on dual elastomeric liners which result in sealant laminated to a laminate of inner liners.

Referring now to FIG. 2, an alternate embodiment of the subject invention is shown in which the inner surface of the tire is formed by a combination of two inner liners; a first inner liner 24, and a second relatively narrower inner liner 24' to which the sealant 20 is in turn laminated to form a laminate 27. The surface of the second inner liner 24' is substantially completely covered with sealant except for the narrow strips 25 and 25' of uncovered liner 24' into which the sealant is smoothly blended after the tire is cured. Using a relatively narrow inner liner facilitates handling the laminate 27 (sealant to inner liner 24') and the laminate's accurate placement on a building drum. The first liner 24 is the conventional "full" inner liner which is then placed over the liner 24' of the laminate 27 during construction of a typical single stage radial steel-belted tire, followed by the belts and tread, as is well known in the art and described in U.S. Pat. No. 3,489,634, inter alia.

In a two stage process for building a tire, the green carcass containing the laminate is transferred to a shaping mechanism for pre-shaping the carcass into a toroid and to its approximate final diameter. A belt and tread assembly is then added, and the green carcass is then transferred to a vulcanization press for final shaping and curing in a conventional manner.

Figure 3:
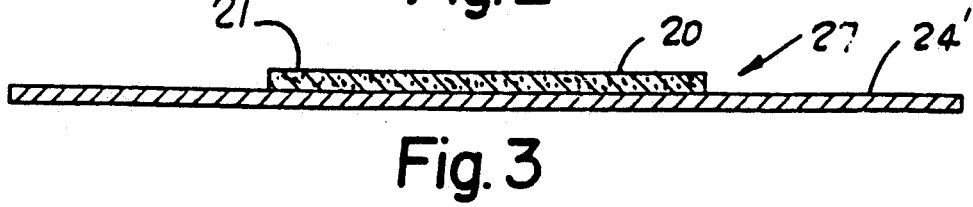
FIG. 3 is a cross-sectional elevation view of a laminate structure in accordance with the present invention.

Referring now to FIG. 3, there is diagrammatically illustrated a cross section of a laminate 27 comprising the inner liner 24' to which sealant 20 is adhesively secured due to its adhesive quality. The sealant is extruded continuously from a slit die in an extruder which extrudes the sealant on to continuous liner or carcass stock, preferably symmetrically the tire's circumferential center line X—X. Because the green tire, with sealant in it, is to be cured in a curing press, essentially no aromatic solvent can be present in the recipe, and none is added. Only extrusion of the recipe produces a uniformly flat strip of sealant. The liner stock, typically butyl rubber, or carcass stock, typically natural rubber, is subsequently cut into appropriate lengths of liner 24'. For ease of handling, the liner 24' is placed on a polyethylene backing strip (not shown) which is fed onto a conveyor carrying the continuous liner stock.

A green carcass is constructed by placing a predetermined length of laminate 22' on a building drum, preferably superimposing a second inner liner 24 upon the first inner liner, then superimposing the other carcass components, including belts, bead rings and tread to finish the carcass. The carcass is then cured conventionally in a curing press so that the sealant is substantially fully cured to the extent dictated by the concentration of curing (crosslinking) agent present and the conditions of curing. It will be recognized that when the sealant is fully cured, all the curing agent is used up, but the sealant may not be, and is not, fully crosslinked.

The uncured sealant has a peak Mooney viscosity at room temperature greater than 70 (large rotor, ML), preferably in the range from about 80 to about 110. Upon curing, the cured sealant has a peak Mooney viscosity at 150° F. of less than 30, preferably in the range from above about 15 but less than 30.

The plastic flow and adhesive qualities of the cured sealant are such that it sticks to a puncturing object inserted into it, and, when the object is withdrawn, the sealant is drawn into the puncture forming a plug which seals the opening against loss of air from within the tire. It is important that the sealant 20 be provided opposite the tread region 16 of the tire 10 and extend radially inwardly along the buttress regions 17 as well. This location of the sealant layer 20 provides maximum protection in the puncture region of the tire 10 most vulnerable to puncture by foreign objects. Because the sealant must be maintained in this location during construction and operation of the vehicle on which the tire is mounted, without being covered, and without any edge strips to restrain flow, the relatively high viscosity of the sealant, before and after it is cured, is of critical importance.

In another embodiment of the invention, the sealant product may be extruded onto a backing strip coated with a detackifier, preferably poly(vinyl alcohol) ("PVA"), so that the lower surface of the sealant may be lifted off the backing strip; and, the upper surface of the sealant is likewise coated with an aqueous solution of PVA, and the upper surface is dried in a long convection oven. When a predetermined length of sealant is then cut from the continuous extrudate, it is wrapped around the building drum so that the dry detackified surface of the sealant is in contact with the drum. The exposed upper surface of the sealant is then wiped with a solvent-soaked sponge to free it from detackifier. The inner liner is then superimposed upon the sealant strip, followed by the other tire components.

It is of particular interest that upon curing a green carcass with an integral sealant/inner liner laminate, the edges of the sealant are smoothly blended into the sidewalls, but there is so little flow of sealant under the heat and pressure of curing that the cured thickness of the sealant is generally not less than 80% of the uncured thickness within a 10 cm band through the center of which runs the mid-equatorial plane X—X.

The necessary viscosity of the sealant, before and after curing, is maintained by ensuring that there is always more than 50 parts of high mol wt elastomer per 100 parts by wt of combined high and low mol wt elastomers, and preferably twice as much high as low mol wt elastomer in the recipe; further, by ensuring that there is more processing aid, selected from a homogenizer and a tackifier, than there is high mol wt elastomer. Most preferably, the viscosity of a recipe containing a major amount of high mol wt elastomer is controlled with the choice of natural rubber stock and the presence of both, a homogenizer and a tackifier. With a Struktol-MS type homogenizer, it is preferred that there be at least twice as much homogenizer than tackifier; and, that the combined wt of homogenizer and tackifier is at least equal to that of the high mol wt elastomer.

The precise ratio of the high to low mol wt elastomers depends mainly on the mol wt of the high mol wt elastomer and other variables such as the particular elastomer involved, the amount and kind of crosslinking agent (curative) used, and the conditions for curing the green tire. The ratio of high to low mol wt is preferably chosen so as to give a MLP/rt above 70, preferably from about 90 to about 110, for the sealant recipe, before it is delivered to the extruder.

The ratio of high mol wt:low mol wt elastomers is always greater than 1, but may range as high as 10 to 1. A preferred ratio is from greater than 1 to about 5, and most preferred is in the range from 2 to about 4.

The MLP/rt viscosity of the sealant recipe, reached at about 1 min or less into the 4 min Mooney curve, most preferably ranges from 95 to about 105. The viscosity of the extrudate when cooled to room temperature is essentially the same as that of the unextruded recipe indicating there is substantially no crosslinking of the sealant after it is extruded. Though not immediately evident, the viscosity of the extrudate, like that of the mix, is too high to enable it to be extruded into a rotating tire, as is taught in the Baboff '172 patent, because there is no convenient way of laying down a uniformly distributed strip of such a viscous extrudate, and cutting it off at the desired moment.

After being exposed to tire-curing conditions, typically range from about 275° to about 400° F., preferably 350° F., and a pressure in the range from about 200-500 psig, the sealant product in the tire is cured to a MLP/150 of less than 30, preferably from above about 15 to 30.

As the high mol wt elastomer of the sealant product, there may be employed any high mol wt elastomer capable of being crosslinked. Examples are the highly unsaturated rubbers such as those based on conjugated diolefins, whether homopolymers as in polyisoprene (particularly cispolyisoprene, whether natural or synthetic), polybutadiene (including polybutadiene of high cis content), polychloroprene (neoprene), or copolymers as exemplified by those having a major proportion of such conjugated dienes as butadiene with a minor proportion of such monoethylenically unsaturated copolymerizable monomers as styrene or acrylonitrile. Alternatively, elastomers of low unsaturation may be used, notably butyl type rubbers (copolymers of such isoolefins as isobutylene with small amounts of conjugated dienes such as isoprene) or EPDM types (copolymers of at least two different monoolefins such as ethylene and propylene with a small amount of a non-conjugated diene such as dicyclopentadiene, 1,4-hexadiene, 5-ethylidene-2-norbornene, etc.). Even saturated elastomers such as EPM or ethylene-vinyl acetate may be employed, using the proper cure system. The elastomer may be emulsion-prepared or solution-prepared, stereo specific or otherwise. The mol wt of the solid elastomer is usually in excess of 50,000 ordinarily within the range of from 60,000 to 2 to 3 million or more. Ordinarily the solid elastomeric component has a Mooney viscosity within the range of from 20 to 160 ML-4 at 212° F.

The low mol wt elastomer employed has a mol wt less than 50,000, usually within the range from 1000 to 10,000, and is preferably of the "liquid" rubber type with a maximum Brookfield viscosity at 150° F. of 2 million cps, ordinarily within the range of from 20,000 to 1 million cps. Examples are: liquid cis-polyisoprene (e.g. heat depolymerized natural rubber, or cis-polyisoprene polymerized to low mol wt), liquid polybutadiene, liquid polybutene, liquid EPDM, and liquid butyl rubber.

The homogenizing agents (homogenizers) used are low mol wt polymeric resin blends which assist the high and low mol wt elastomeric components to form a homogeneous, uniform, processable mass. The homogenizers are available as semi-solid low melting point resins, having varying polarities, in block or friable flake form. The homogenizer is compatible with aliphatic, naphthenic and aromatic portions of the elastomers in a blend. Commercially available homogenizers are Struktol ® 40MS and Struktol NS, inter alia. Each homogenizer may be used in conjunction with a plasticizer to lower the viscosity or soften the elastomer.

The tackifier is preferably a low mol wt material such as a rosin ester (e.g. Staybelite ® Ester 10); aliphatic petroleum hydrocarbon resins (e.g. Piccopale ® A-70 and 100S); polyterpene resins derived from alpha-pinene (e.g. Piccolyte ® A-10), beta-pinene (e.g. Piccolyte S-25); resins made from styrene and related monomers (e.g. Piccolastic ® A-5); resins made from dicyclopentadiene (e.g. Piccodiene ® 2215); and resins from the reaction of a mineral oil purification residue with formaldehyde and with nitric acid catalyst according to U.S. Pat. No. 3,544,494 sold under the Struktol trademark).

The sealant recipe includes a sufficient quantity of a curing agent, effective under curing press conditions, so that upon curing, the sealant in the tire is crosslinked to essentially the extent dictated by the curing agent present. Suitable curing agents are:

1. Sulfur curing systems such as those based on sulfur or sulfur-yielding materials (e.g. tetramethyl thiuram disulfide) and conventional accelerators of sulfur vulcanization.

2. Quinoid curing systems such as p-quinone dioxime (GMF ®, from Uniroyal Chemical) with or without supplementary oxidant.

3. Organic peroxides or hydroperoxides (together referred to as "(hydro)peroxides" for brevity) are free radical generating catalysts such as dicumyl peroxide, cumene hydroperoxide, methyl ethyl ketone hydroperoxide or other free radical generating catalysts such as azobisisobutyronitrile.

4. Polyisocyanates such as MDI (4,4'-methylene bis-phenyleneisocyanate), TDI (toluene diisocyanate), and PAPI (polymethylene polyphenylisocyanate) as well as dimers and trimers of MDI and TDI.

The amount of curing agent used will vary with the elastomers employed and with their proportions, as well as with the structure of the curing agent, and conditions under which it is used. The amount used is sufficient to prevent significant flow of the sealant in a tire at temperatures up to 200° F. and vehicle speeds up to 70 mph while still retaining sufficient adhesiveness and conformability to perform the described sealant function. The more the high mol wt elastomer, generally the less curing agent required. For a depolymerized natural rubber (DPR) natural rubber (NR) mixture, the amount of sulfur containing or quinoid type curing agent will be in the range of from more than 0.5 to 2.0 phr (parts per 100 parts by wt of both elastomers added together), ordinarily from 0.7 to 1.5 phr. For the same mixture, with a polyisocyanate curing agent, the amount required will range from 2 to 10 phr, preferably 2.5 to 8 phr. The applicable range for (hydro)peroxide would be 0.1 to 1.0 phr, preferably 0.2 to 0.7 phr, and the (hydro)peroxides are most preferred. Whichever curative is used, it is essential that the amount used provide the sealant product with a cured MLP/150 which is in the range from 15 but below 30.

(Hydro)peroxides include aromatic or aliphatic (hydro)peroxides, for example the diacyl peroxides, dibasic acid peroxides, ketone peroxides, and alkyl peroxyesters or hydroperoxides; in particular, diacetyl peroxide; dibenzoylperoxide; bis-2,4-dichlorobenzoyl peroxide; ditert-buytlperoxide; dicumylperoxide; tertbutylperbenzoate; tert-butylcumylperoxide; 2,5-bis(tertbutylperoxy)-2,5-dimethylhexane; 2,5-bis(butylperoxy) dimethylhexyne-3; 4,4',4'-tetra(tert-butylperoxy)-2,2-dicyclohexylpropane; 1,4-bis(tert-butylperoxy-isopropyl)-benzene; 1,1-bis(tert-butylperoxy)3,3,5-trimethylcyclohexane; lauroyl peroxide; succinic acid peroxide; cyclohexanone peroxide; tert-butylperacetate; butyl hydroperoxide; and the like.

The amount of (hydro)peroxide used is preferably from 0.8 to 3.0 millimoles (mmol), more preferably from 0.9–2.6 mmol per 100 g of high mol wt elastomer. Specifically with dicumyl peroxide, from 1.4–2.4 mmol/100 g maintains a MLP/150 in the range from 15 to less than 30, preferably 17–28, most preferably 18–25.

It is desirable to add an antioxidant, antiozonant or other stabilizer in the sealant recipe, but it is not desirable to add a pigment such as carbon black, or any particulate inorganic fillers or extenders, all of which tend to denigrate the efficacy of the sealant; neither is it desirable nor necessary to add fibrous fillers to the sealant composition because these adversely affect the control of viscosity in the necessary range.

In practicing the invention, the ingredients are mixed together uniformly in a sigma-bladed Baker-Perkins blender, internal Banbury mixer, or the like, and the resulting mixture (recipe) is extruded to form a flat strip about 0.1 inch to about 0.5 inch thick on the laminate.

The puncture sealant ability and resistance to flow of the sealant is tested in an inflated tire run at a rotational speed equivalent to a vehicle speed of 50 to 75 mph and a load sufficient to generate an internal temperature of 200° F. After the run, the tire is examined to see if the sealant has flowed out of the shoulders and into the crown area, or whether the sealant has formed a puddle in the bottom of the tire. Puncture sealant ability is evaluated by puncturing the tire with nails of different sizes which are subsequently removed from the tire, and the loss of air pressure within the tire is measured.

The following examples will serve to illustrate the practice of the invention in greater detail.

EXAMPLE 1-6

A sealant containing 62 parts of natural rubber (NR), 43 parts depolymerized rubber DPR-400, 64 parts Struktol 40MS homogenizer, and 21 parts Piccopale 100SF tackifier, was blended with 0.5 parts stabilizer; then, 0.5 parts dicumylperoxide in a 40% concentration were added. The NR is standard Malaysian with ML-4(100° C.) of about 60. The viscosity of the DPR-400 is 80,000 cp at 150° F. (66° C.). The stabilizer is a mixture of 40% distearylthio dipropionate, 20% blend of substituted phenylenediamine antiozonants, 20% nonylated phenylphosphite antioxidant, and 20% thiodiethylenebis(3,5-di-t-butyl-4-hydrophenylpropionate) antioxidant.

The mix was extruded as a layer about 9" (ins.) wide and 0.35" thick onto a continuous web of inner liner 11 ins wide, to form a laminate, the upper surface of which is sprayed with an aqueous solution of PVA and dried. The laminate was then used to build a carcass of a self-sealing 225HR60-15 tire. The MLP/rt of the mix was 100, and that of the extrudate was essentially the same. After the tire is expanded in the second stage, the thickness of the sealant is about 0.2" except within about 0.5" of the edges where they are tapered and blended into the sidewalls. The cured sealant thickness is found to be about 0.2" with the edges of the sealant remaining smoothly faired into the sidewalls. A portion of the sealant, when cured at 182° C. for 15 minutes, has a peak MLP/150 of 28.

The tire was mounted on a Getty wheel and inflated. As a measure of sealing efficiency, sixteen 20d nails, shank diameter of 0.185" and 2.5" long, were driven into the tire, some in the outer ribs, some in the outer grooves and others in inner positions through lugs and grooves. The tires were spun at various speeds corresponding to vehicle speeds ranging from 50 to 75 mph (ca 80–120 km/hr) causing all the nails to be expelled by centrifugal force. The number of sealed punctures in relation to the total number of punctures (16) was determined, and the results were listed as a ratio of seals/punctures.

Though the ratio of NR to DPR is the same in all tests (62/38), and the ratio of homogenizer to tackifier is not varied in the 6 examples of sealant product tested, the sensitivity of the sealant to the amount of dicumyl peroxide ("dicup") under identical curing press conditions, is illustrated in the following Table I. A rating of 8 successfully sealed punctures out of 16 (50%) is deemed unsatisfactory, 9 out of 16 is acceptable, and 10 or more out of 16 is preferred. Most preferred is at least 13 out of 16.

TABLE I

|  | Run No. | | | | | |
|---|---|---|---|---|---|---|
|  | 1 | 2 | 3 | 4 | 5 | 6 |
| Dicup, parts | 0.46 | 0.61 | 0.78 | 0.93 | 1.07 | 1.39 |
| MLP/150 | 16 | 18 | 20 | 23 | 25 | 30 |
| Seals/punctures | 12/16 | 14/16 | 15/16 | 14/16 | 14/16 | 8/16 |

Examples 7–12

Additional self-sealing tires were constructed using a sealant in which the ratio of high mol wt (NR)/low mol wt (DPR), and the ratio of homogenizer(Struktol MS)/tackifier (Piccopale A-70), were varied. The amount of stabilizer (same as used hereinabove) and dicup were kept substantially constant. The recipes used, and the results obtained are set forth hereinbelow in Table II.

TABLE II

|  | Run No. | | | | | |
| --- | --- | --- | --- | --- | --- | --- |
|  | 7 | 8 | 9 | 10 | 11 | 12 |
| High mol wt (NR) | 57 | 61 | 64 | 68 | 83.4 | 90 |
| Low mol wt (DPR-400) | 43 | 39 | 36 | 32 | 16.6 | 10 |
| Struktol MS-40 | 37 | 65.1 | 58 | 58 | 53 | 63 |
| Piccopale 100S | 20 | 32.6 | 28 | 28 | 32 | 42 |
| Stabilizer | 0.6 | 0.6 | 0.6 | 0.6 | 0.6 | 0.6 |
| Dicup, parts | 1.0 | 1.0 | 1.0 | 1.0 | 1.0 | 1.0 |
| MLP/150 | 20 | 18 | 20 | 19 | 26 | 28 |
| Seals/ punctures | 14/16 | 12/16 | 14/16 | 14/16 | 14/16 | 14/16 |

What is claimed is:
1. A sealant product consisting essentially of
an extruded, generally flat strip of a surface-detackified homogeneous mixture of
(i) high molecular weight and low molecular weight elastomers present in a weight ratio (high mol wt/low mol wt) greater than 1;
(ii) a processing aid selected from a homogenizer and a tackifier, provided that the combined weight of homogenizer and tackifier is at least equal to that of the high molecular wt elastomer;
(iii) a curing agent, effective at a temperature in the range from about 250°–450° F. and a pressure in the range from about 200–500 psig to substantially fully cure said high molecular wt and low molecular wt elastomers to the extent determined by the molar amount of curing agent which is present in the range from about 0.8 to about 3.0 millimoles per 100 g of high molecular wt elastomer; and,
(iv) a stabilizer in an amount from about 0.1 to about 1.0 part per 100 parts of combined high and low molecular wt elastomers;
said mixture having a room temperature peak Mooney viscosity in the range from above 70 to about 110, which viscosity is substantially the same after said mixture is extruded; and,
said strip having its upper and lower surfaces coated with a detackifier in an amount effective to negate adhesion of the surfaces to metal, said detackifier being removably coated upon one surface of said strip.
2. The sealant product of claim 1 wherein said high molecular weight elastomer has a Mooney viscosity of from 20 to 160 ML-4 at 212° F., the low molecular weight elastomer is a liquid rubber having a Brookfield viscosity at 150° F. of from 20,000 to 2,000,000 cps, and the curing agent is selected from the following, present in the amounts recited:
from more than 0.5 to 2.0 parts of sulfur or sulfur-yielding curative;
from more than 0.5 to 2.0 parts of quinoid curative;
from 0.1 to 1.0 part of a free radical generating curative; and,
from 2 to 10 parts of polyisocyanate curative.
3. The sealant product of claim 2 wherein the liquid rubber is heat depolymerized natural rubber.
4. The sealant product of claim 2 wherein the low molecular weight elastomer is selected from the group consisting of liquid cis-isoprene, liquid polybutadiene, liquid polybutene, liquid ethylene-propylene-non-conjugated diene terpolymer rubber, and liquid isobutylene-isoprene copolymer rubber.
5. The sealant product of claim 2 wherein the high molecular weight elastomer is selected from the group consisting of conjugated diolefin homopolymer rubbers, copolymers of a major proportion of a conjugated diolefin with a minor proportion of a copolymerizable monoethylenically unsaturated monomer, copolymers of isobutylene with a small amount of isoprene, ethylene-propylene-non-conjugated diene terpolymers, and saturated elastomers.
6. The sealant product of claim 2 wherein said homogenizer and said tackifier are each present and there is more homogenizer than tackifier, by weight, present.
7. The sealant product of claim 2 wherein said homogenizer is a low molecular weight polymeric resin blend adapted to coalesce and mix the high and low molecular weight elastomers and tackifier into a uniform mass.
8. The sealant product of claim 2 wherein said tackifier is selected from the group consisting of a rosin ester, aliphatic petroleum hydrocarbon resin, polyterpene resin derived from alpha-pinene, beta-pinene, resins made from styrene and related monomers, resins made from dicyclopentadiene, and, resins from the reaction of a mineral oil purification residue with formaldehyde and with nitric acid catalyst.
9. The sealant product of claim 2 wherein said free radical generating catalyst is an aromatic peroxide.
10. The sealant product of claim 2 wherein said detackifier is poly(vinyl alcohol).
11. An elastomeric laminate comprising,
(a) an air-impermeable elastomer strip for use in an article to be cured under heat and pressure;
(b) a layer of puncture sealant adhered to the upper surface of said elastomer strip, said sealant covering an area from about 20% to substantially the entire area of the strip, said sealant consisting essentially of a homogeneous mixture of
(i) high molecular weight and low molecular weight elastomers present in a weight ratio (high mol wt/low mol wt) greater than 1;
(ii) a processing aid selected from a homogenizer and a tackifier, provided that the combined weight of homogenizer and tackifier is at least equal to that of the high molecular wt elastomer;
(iii) a curing agent, effective at a temperature in the range from about 250°–450° F. and a pressure in the range from about 200–500 psig to substantially fully cure said high molecular wt and low molecular wt elastomers to the extent determined by the molar amount of curing agent which is present in the range from about 0.8 to about 3.0 millimoles per 100 g of high molecular wt elastomer; and,
(iv) a stabilizer in an amount from about 0.1 to about 1.0 part per 100 parts of combined high and low molecular wt elastomers;
said mixture having a room temperature peak Mooney viscosity in the range from above about 70 to about 110, which viscosity is substantially the same after said mixture is extruded; and,
(v) said layer of sealant having its upper surface coated with a detackifier in an amount effective to negate adhesion of the detackified surface to metal.
12. The sealant product of claim 11 wherein said high molecular weight elastomer has a Mooney viscosity of from 20 to 160 ML-4 at 212° F., the low molecular weight elastomer is a liquid rubber having a Brookfield viscosity at 150° F. of from 20,000 to 2,000,000 cps, and the curing agent is selected from the following, present in the amounts recited:

from more than 0.5 to 2.0 parts of sulfur or sulfur-yielding curative;
from more than 0.5 to 2.0 parts of quinoid curative;
from 0.1 to 1.0 part of a free radical generating curative; and,
from 2 to 10 parts of polyisocyanate curative.

13. The sealant product of claim 12 wherein the liquid rubber is heat depolymerized natural rubber.

14. The sealant product of claim 12 wherein the low molecular weight elastomer is selected from the group consisting of liquid cis-isoprene, liquid polybutadiene, liquid polybutene, liquid ethylene-propylene-non-conjugated diene terpolymer rubber, and liquid isobutylene-isoprene copolymer rubber.

15. The sealant product of claim 12 wherein the high molecular weight elastomer is selected from the group consisting of conjugated diolefin homopolymer rubbers, copolymers of a major proportion of a conjugated diolefin with a minor proportion of a copolymerizable monoethylenically unsaturated monomer, copolymers of isobutylene with a small amount of isoprene, ethylene-propylene-non-conjugated diene terpolymers, and saturated elastomers.

16. The sealant product of claim 12 wherein said homogenizer and said tackifier are each present and there is more homogenizer than tackifier, by weight, present.

17. The sealant product of claim 12 wherein said homogenizer is a low molecular weight polymeric resin blend adapted to coalesce and mix the high and low molecular weight elastomers and tackifier into a uniform mass.

18. The sealant product of claim 12 wherein said tackifier is selected from the group consisting of a rosin ester, aliphatic petroleum hydrocarbon resin, polyterpene resin derived from alpha-pinene, beta-pinene, resins made from styrene and related monomers, resins made from dicyclopentadiene, and, resins from the reaction of a mineral oil purification residue with formaldehyde and with nitric acid catalyst.

19. The sealant product of claim 12 wherein said free radical generating catalyst is an aromatic peroxide.

20. The sealant product of claim 12 wherein said detackifier is poly(vinyl alcohol).

* * * * *